United States Patent [19]

Schiltz

[11] Patent Number: 5,449,708

[45] Date of Patent: Sep. 12, 1995

[54] BIODEGRADABLE STARCH-BASED POLYMER COMPOSITIONS

[76] Inventor: David C. Schiltz, 5020 Heathmoor Dr., Columbus, Ohio 43220

[21] Appl. No.: 82,916

[22] Filed: Jun. 25, 1993

[51] Int. Cl.[6] .......................... C08L 3/00; C08L 89/00
[52] U.S. Cl. ...................................... 524/47; 523/126; 523/128; 524/312; 524/381; 524/394; 524/377
[58] Field of Search ................ 524/47, 394, 381, 312, 524/377; 523/126, 128

[56] References Cited

FOREIGN PATENT DOCUMENTS 9014388 11/1990 WIPO ................................ 523/128

Primary Examiner—Paul R. Michl
Assistant Examiner—LaVonda R. DeWitt
Attorney, Agent, or Firm—Reinhart, Boerner, Van Deuren, Norris & Rieselbach

[57] ABSTRACT

A method for continuous preparation of a starch-based biodegradable polymer. A homogeneous mixture of starch, an ethylene acrylic acid co-polymer, and a salt of stearic acid are premixed before addition of an aqueous lubricant material. An increase in temperature gelatinizes the starch and melts the co-polymer. Excess moisture is removed under reduced pressure and a plastic material is extruded.

22 Claims, 1 Drawing Sheet

BIODEGRADABLE STARCH-BASED POLYMER COMPOSITIONS

BACKGROUND OF THE INVENTION

This invention is related generally to biodegradable plastic materials comprising natural starch and synthetic polymers. In particular, this invention is directed to processes for the preparation of such materials having improved biodegradability and physical performance properties.

The past decade has witnessed a renewed interest in the environment. The special attention afforded so-called "green" products and methods of production attest to the fact that commercial viability is not always contrary to resource conservation. Often, environmental regulations and/or restrictions provided the impetus for innovative methods, compositions and apparatus.

A case in point is the recent legislative trend toward banning landfill disposal of various waste materials. Many hazardous chemical and biological wastes have long been restricted, but as available landfill space becomes increasingly scarce, many plastic products and packaging materials will soon require alternate means of disposal and/or compositional changes to enhance the rate of biodegradation. Plastics currently form a significant fraction of the materials in landfills. According to some estimates, even though they comprise only 7% to 9% by weight, they make up 15% to 20% of the waste volume, and total more than 30% of the waste area, because the fraction is comprised mainly of thin films, sheets and the like. As the use of landfills becomes increasingly restrictive, the need to address plastic wastes will become even more pertinent. With decreasing petroleum reserves and rising costs of the plastics derived therefrom, the need for viable substitutes from alternative raw materials will increase.

Early concern over such issues led technical communities and government to recognize the need for appropriate use of biodegradable plastic materials. Starch is an abundant, low-cost, biodegradable polymer. It has long been contemplated that its use in plastic and/or film production would reduce the demand for petroleum-derived polymers and simultaneously relieve the adverse environmental impact caused by land-fill disposal. It is well-known that starch, alone, forms a brittle film which is sensitive to water and, therefore, is biodegradable, but it must be combined with other materials, typically synthetic polymers, in order to provide the physical properties necessary for practical, commercial applications.

By the late 1980's biodegradable plastics were applied (and, unfortunately, often misapplied) in various use situations. The misapplication of inappropriate or incompletely developed technology led to products which often did not meet performance claims and expectations. The so-called "first generation technologies" often lacked one or more of the following: (a) rate and/or extent of biodegradation, primarily due to limitations of starch incorporation; (b) necessary physical properties and related characteristics; (c) an economical means to effectively and efficiently manufacture starch-based blends; (d) intermediate product compatibility with conventional plastics product conversion processes; and (e) lower limits on film thickness caused by the use of non-gelatinized starch materials.

The search for degradable plastic materials meeting the requirements stated above has been an ongoing concern in the art. Additional research and development has led to new discoveries in the field of biodegradable plastics. Newer "second generation" technologies more closely provide the required and desired levels of biodegradability, physical performance and film thickness through acceptable manufacturing processes at reasonable product cost.

The pursuit and development of second and even third generation technologies has taken many approaches. Biodegradable components utilized include polylactic acids, polycaprolactones and polyhydroxybutyrate-valerates. However, starch continues to be the predominant material investigated in the pursuit of these goals. According to a recent industry overview of biodegradable plastic technologies, starch is the most common among the rapidly biodegradable components used in such polymers. Starch biodegrades in 1 to 2 weeks through composting, sewage, or anaerobic biodigestion. Further, because starch is a renewable resource, commonly produced and processed around the world, it has a low cost relative to other such components, especially those which are petroleum-based.

U.S. Pat. No. 4,076,117 discloses modifying the starch component, without gelatinization, as a filler and to improve mixing with synthetic polymers such as polyethylene. This granule-based technology is limited by the amount of starch which can be incorporated into the plastic composition, without detrimentally affecting the physical properties of the end product. Low starch content, however, decreases the rate and extent of biodegradation. Furthermore, non-gelatinized corn starch limits the thickness of any resultant film to approximately 1.0 mil. Rice starch granules are considerably smaller, but available only at a significantly greater cost.

U.S. Pat. No. 4,337,181 discloses that the starch component may be gelatinized to disrupt the granules, access the molecular structure, and achieve a uniform dispersion. After the starch is partially gelatinized, the gel is mixed with ethylene acrylic acid copolymer to produce a starch-polymer composite. A higher acrylic acid content facilitates aqueous dispersion. The result is enhanced physical properties and greater degradability due to higher starch content and improved molecular accessibility. However, such batch methods are time-consuming and often do not provide materials with the desired physical and performance properties. In addition, because the acrylic acid content, in large part, determines polymer cost, the high acid levels overall represent an increased cost and economic disadvantage.

As a result, the prior art is associated with a number of significant problems and deficiencies. Most are related to the non-homogeneous dispersion and incorporation of starch into the plastic composition, and result from the methods and processes currently used.

It is, therefore, an object of this invention to provide a starch-based polymer composition and method for preparing the same, overcoming the problems and shortcomings of the prior art.

It is another object of this invention to provide a method for the continuous preparation of starch-based polymer compositions.

It is another object of this invention to provide a method for the continuous preparation of starch-based polymer compositions which is quicker, more efficient than batch and/or semi-continuous methods, and which simultaneously provides compositions having excellent physical properties and performance characteristics.

It is another object of this invention to provide a method for the continuous preparation of starch-based polymer compositions comparable with a wide variety of auxiliary processing techniques, including, but not limited to casting, simple extruding, milling, extrusion blowing and injection molding, as well as any other procedure which would lend itself to the formation of thin films, hollow tubing or rods, and the like, which could be used to manufacture biodegradable, finished products.

It is an object of this invention to provide a method for the preparation of starch-based polymer compositions such that copolymer components having significantly lower levels of acrylic acid, than otherwise thought possible, may be used, thereby achieving cost and related economic benefits.

It is yet another object of this invention to provide a method for the continuous preparation of starch-based polymer compositions such that the rate and/or extend of biodegradation is improved and/or independent of the starch content.

It is a further object of this invention to provide a method for the continuous preparation of starch-based polymer compositions such that starch gelatinization is optimized, thereby resulting in improved physical properties and enhanced biodegradability.

It is yet another object of this invention to provide a method for the continuous preparation of starch-based polymer compositions having improved composting characteristics.

It is an object of this invention to provide an improved starch-based polymer composition and a method of preparation through the addition of novel additives which enhance processing and result in excellent physical properties and performance characteristics.

It is an object of this invention to provide an improved starch-based polymer composition, one more efficiently prepared and simultaneously exhibiting excellent physical properties and performance characteristics through use of a low acrylic acid content copolymer.

It is a further object of this invention to provide a method for the continuous preparation of starch-based polymer compositions through pH control at an early process stage, such that starch gelatinization and starch-acrylic acid complexation are enhanced.

It is an object of this invention to provide a method for the continuous preparation of starch-based polymer compositions which permits control over water content, such that sufficient moisture is retained to lubricate the starch fraction without process complications.

These and other important objects will be apparent from the descriptions of this invention which follow hereafter.

DETAILED DESCRIPTION OF A PREFERRED EMBODIMENT

Figure 1:
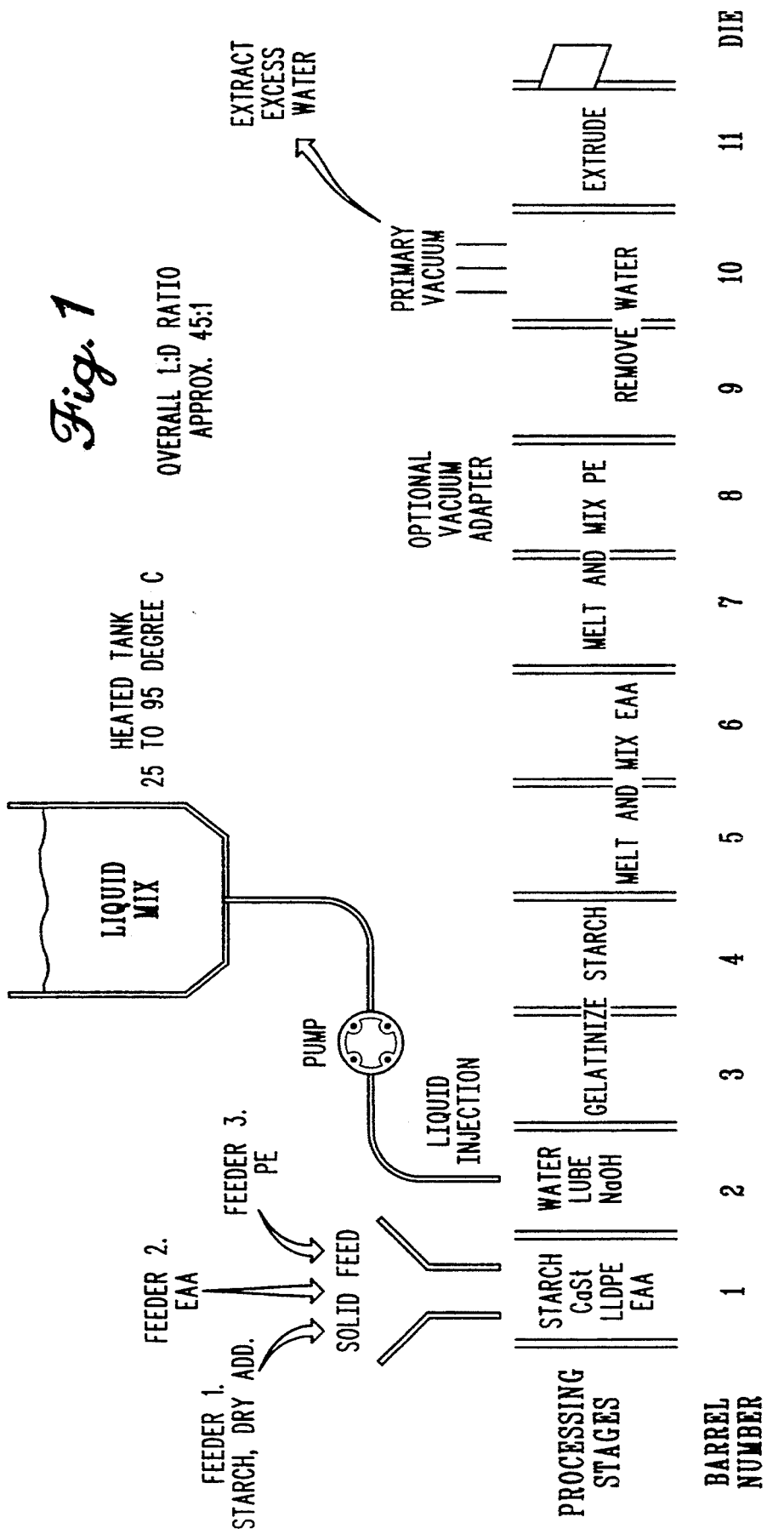
FIG. 1 represents the continuous preparation of a starch-based polymer material, in accordance with the method of this invention.

This invention is a method for the continuous preparation of a starch-based plastic material. It overcomes certain well-known problems and deficiencies of the prior art, including those outlined above. An important aspect of this invention is the efficient and effective combination of the starch and polymeric components to provide a compostable polymer material with improved physical properties and biodegradability.

In part, this invention is a method for the continuous preparation of a starch-based plastic material including the steps of (1) providing a substantially homogenous mixture of starch, an ethylene acrylic acid copolymer, and a stearic acid salt; (2) adding thereto an aqueous lubricant solution having a pH between 10–12 and a temperature of less than or equal to about 95° C.; (3) raising the temperature of the resulted mixture to about 135° C. to gelatinize the starch and melt and mix the copolymer with the starch; (4) lowering the temperature to about 110° C.; (5) reducing the atmospheric pressure to about 5–28 pounds per square inch to remove excess moisture from the mixture; and (6) extruding the resultant composite material. The starch copolymer and stearic acid components may either be premixed or introduced separately in such a way as to achieve a substantially homogenous mixture.

In preferred embodiments, polyethylene is further provided as an additional polymeric material, and the lubricant is selected from a number of water-soluble compounds including glycerol, sorbitol, ethylene glycol, and a low molecular weight polypropylene glycol. In preferred embodiments of the inventive method, the pH of the lubricant solution is between 11.0 to 11.5, and obtained by adding an alkaline material selected from the group consisting of sodium hydroxide, ammonium hydroxide, and triethanolamine. In highly preferred embodiments, the alkaline material used to achieve the desired pH is sodium hydroxide. In such a way, the starch component is substantially gelatinized before and during its mixture with the copolymer and/or additional polymeric components.

In preferred embodiments, the system pressure is reduced to about 15–25 pounds per square inch, thereby reducing said moisture content to about 5–10% by weight of the mixture. In highly preferred embodiments, the moisture level is reduced to about 6–8% by weight of the mixture.

The resultant plastic material is extruded at a temperature of less than or equal to 135° C. In preferred embodiments, the material is cooled as it is extruded; in highly preferred embodiments, the material is cooled by air.

In part, the continuous preparatory method of this invention also includes the employment of specific relative amounts of starch and copolymer, in the presence of additional additives to provide concomitantly an increased rate of biodegradation and improved performance characteristics. In preferred embodiments, the starch component is about 20–90% by weight, the copolymer component is about 5–50% by weight, and the stearic acid salt is about 0.1–2.0% by weight of the total composition. In highly preferred embodiments, the starch is present in an amount about 30–50% by weight, the copolymer present in an amount about 10–40% by weight and the stearic acid salt is present in an amount about 0.5–1.5% by weight. In highly preferred embodiments, the copolymer is about 8–12% by weight acrylic acid and plastic material produced may also contain polyethylene in an amount about 1–40% by weight of the material composition. Likewise, in preferred embodiments, glycerol is used as a lubricant, in an amount about 1–20% by weight of the material composition. In highly preferred embodiments, glycerol is about 2–15% by weight of the material composition.

In the continuous process described herein, the starch is substantially gelatinized prior to and during its dispersion within the ethylene acrylic acid copolymer and, where applicable, polyethylene. Gelatinization disrupts the starch granules and provides access to individual starch molecules to compatablize the starch for use in the plastic material, and at the same time increase biodegradation. The liquid mix of water and a lubricant at a specific pH is used to affect gelatinization at the temperature, mix, and pressure parameters indicated.

The method of this invention may be used for both blown film extrusion and injection molding. Injection molded samples of 40 to 60 percent starch have been successfully produced using this technology, with significant degradation obtained in biologically-active soils in as little as ten weeks. End products weighing only several grams with a wall thickness of 0.013 inches and as large as ½ pound with a wall thickness of 0.125 inches have been successfully produced using conventional injection molding equipment with only minor modifications to normal operating conditions. Films may be blown successfully within both vented and non-vented extruders and at moisture levels of approximately 3 to 10% by weight; a water content of 5 to 7% by weight is preferred.

The overall advantage of this technology is the combination of physical properties achieved, the extent and rate of biodegradation, and low cost. This unique combination is due to the use of gelatinized starch which provides excellent dispersion, thinner films, and better physical/performance properties; the disclosed component additives; and the disclosed EAA copolymer with specific acrylic acid levels and preferred melt indices—all within the parameters of the continuous method of preparation described herein. While starch gelatinization has been employed previously, it has been used exclusively in conjunction batch processes. A continuous process, as compared to batch processes, provides advantages related to lower cost and consistent material quality. Such benefits are available through an improved gelatinization sequence, an important aspect of this invention.

The continuous process described herein may be effected through use of apparatus familiar to those skilled in the art. As described herein, the process lends itself especially well to use of an intermeshing, self-wiping, co-rotating, twin-screw extruder. Such an apparatus is uniquely configured for use with the inventive process, in that it produces a very fine homogenous mix of all ingredients, particularly starch molecules which are difficult to otherwise disperse uniformly among other components. With twin-screw extruders, mixed or compounded materials may be produced by continuously feeding raw materials, mixing, and collecting the resultant manufactured product. The excellent mixing and dispersion achieved contribute significantly to the degradability and the improved physical and aesthetic properties observed. A twin-screw extruder and related equipment useful to effect the method described herein are well-known to those skilled in the art made aware of this invention.

A continuous manufacturing process requires accurate feeding, adequate heating and cooling control systems, and fast, effective overall mixing capabilities, a twin-screw extruder, such as that described herein, controls material feed rates, the temperature of materials during feeding and mixing, the levels of sheer force (through screw design and screw speed), temperature profiles along the extruder, and vacuum/water removal rates.

FIG. 1 schematically illustrates the pertinent processing steps of the continuous preparation method described herein, with barrel numbers referencing specific process segments associated with a twin-screw extruder assembly.

Referring to Stage 1, dry raw materials, including starch, ethylene acrylic acid, polyethylene (optional), and other dry additives, (calcium stearate preferred) are introduced. Dry additives, which are required in very low concentrations, can be premixed dry with starch prior to controlled automated feeding. The use of separate feeders for starch and optional dry additives, EAA, and polyethylene (optional) is preferred. It is recognized that fewer feeders could be used for some formulations. Barrel temperature is ambient.

As shown in Stage 2, the liquid mix is fed or injected. The liquid mix can contain any water soluble material. Preferred materials contained in the liquid include water and a water soluble lubricant (such as glycerol, sorbitol, ethylene glycol, low molecular weight polypropylene glycol). The liquid mix is adjusted to pH=10.0 to 12.0, with 11.0 to 11.5 preferred. The pH can be adjusted with any water soluble alkaline material, such as sodium hydroxide, ammonium hydroxide, or triethanolamine. Sodium hydroxide is preferred. The liquid mix is preferably heated, up to 95° C., to enhance gelatinization and increase the effectiveness of the liquid upon entry into the extruder. Barrel temperature is approximately 90° C.

In Stages 3 and 4, the starch is mixed with the heated, high pH liquid to promote and accelerate gelatinization. Barrel temperature is on the order of 120° C. to optimize process conditions.

At Stages 5–6 and 7–8, ethylene acrylic acid copolymer begins to melt. The EAA, due to its lower melting temperature, will melt and mix with the gelatinized starch prior to any polyethylene present. This is important because the EAA seems to function as an interface between the starch and the polyethylene components. Barrel temperatures ideally approach 135° C. Referring to Stages 7–8, polyethylene continues to melt and mix with other ingredients. Barrel temperatures are decreased to approximately 130° C.

As shown in Stage 9, complete mixing stops and materials are conveyed to the next step. Heat is removed, dropping the temperature to 110° C. At Stage 10, excess water is removed from the composite using a vacuum port and an attached vacuum pump. Vacuum pressures are 5 to 28 psi, preferably at 15 to 25 psi. Vacuum settings can be adjusted to maintain a final moisture level of approximately 5% to 10% by weight. Six to eight percent water by weight is preferred. Barrel temperature remains at 110° C. The residual moisture benefits the processing of these materials, in that it lubricates and plasticizes the starch amylose phase and aids in maintaining the intended gelatinized state. The moisture-derived benefits appear to overcome any disadvantage related to process equipment configuration.

At Stage 11, the compound is pressurized in preparation for strand extrusion. (Barrel temperature remains at 110° C.) Die temperatures are about 135° C.; a higher temperature provides good material flow at the die surface. Typically, a strand has a a length: diameter ratio of approximately 45:1. These dimensions are preferred, but it is likely that a slightly longer or a slightly shorter configuration would also provide satisfactory results.

Additional important process steps include feeding control and strand cooling. Cooling of extruded strands is achieved by forced air. Cooling by conventional water bath methods, as used in the plastic industry, is avoided to prevent water/moisture pick-up by the warm extruded strands. The warm composite may be extruded onto a cool, dry belt to carry the strands through an air stream prior to pelletizing, or a hot-face pelletizer may be employed. The hot face pelletizing system cuts the extruded strands as they exit the die and are then immediately air conveyed (and cooled) to a collection station.

The inventive method combines all raw materials and extrudes plastic strands, cools the strands, and pelletizes or cuts the strands into small pieces such that they can be packaged, shipped, and then converted to a final product by an industrial customer prior to use by the ultimate consumer. The final product form can be extruded film, e.g. agricultural mulch film or liners for disposable diapers; thermoformed sheets, e.g. shallow trays for seedlings/plants for use in green houses; or injection molded items, e.g. disposable cutlery. Many other final applications also exist for products manufactured from film, molding, and forming. It is also expected that this material can be extrusion coated onto paper and paperboard products to impart temporary moisture resistance, yet retain the natural biodegradation properties of the paper product.

Secondary processing includes blown film extrusion, cast film extrusion, injection molding, and sheet extrusion followed by thermoforming. Products can be either converted in-line with the compounding mixing process or products can be converted at other locations. The latter requires pelletizing of the intermediate product to facilitate packaging and transportation. Re-heating the product for secondary process does not harm the product or its properties.

End use of the composite materials derived through employment of this invention will, in part, determine the type and composition of the composite required. The relative portions of starch, polyethylene, and ethylene acrylic acid copolymer may be varied to engineer and/or design specific physical and performance properties into the final composite/product. This invention contemplates the addition of other materials, whether or not polymeric, to achieve specific properties. For example and in accordance with this invention, polyvinyl alcohol may be added in varying amounts to effect a desired change in the rate and extent of biodegradation. Conversely, one of several well-known uv light stabilizers, such as carbon black, may be added to improve weatherability properties before composting/biodegradation is required.

Many other additives may be incorporated into the composite material, including anti-oxidants, opacifying agents, various stabilizers, herbicides, fungicides, and fertilizers. These materials may be added in amounts necessary to achieve the desired effect in a manner entirely consistent with the continuous method described herein. Incorporation into the method is dependent upon mix characteristics, water solubility, temperature stability, and the like.

The starch used in conjunction with this invention may be any starch obtained from a cereal grain or root crop including, without limitation, corn, wheat, rice, potato, and tapioca. Both high and the low amylose and amylopectin-type starches have been shown to perform comparably with this method and under the parameters described herein. Likewise, modified or derivatized starch products may also be used. Generally, as used herein, the term "starch" includes all starches, starch flours, and starch components or products. The amounts of starch incorporated into the composites of this invention are determined through consideration of composite properties and biodegradability. However, in contrast to methods of the prior art, the continuous process of this invention permits utilization of less starch with higher performance and enhanced biodegradation.

In the continuous process of this invention, the starch is gelatinized prior to and during dispersion within the ethylene acrylic acid copolymer and, optionally, polyethylene. Gelatinization disrupts the starch granules, providing access to individual starch molecules. Extensive gelatinization is critical for compatibility of the starch with the copolymer component and, later, with respect to biodegradability. An aqueous solution of lubricant, having a preferred pH, with the appropriate temperature and sheer forces, effects the desired degree of gelatinization.

An important aspect of the method is gelatinization at an appropriate pH. Contrary to the prior art, it has been found most advantageous to provide an aqueous component having an appropriate pH at an early stage in the process. Without being bound to any one theory, explanation or rationale, it appears a pH between 10.0 and 12.0, preferably 11.0–11.5, facilitates starch gelatinization, copolymer solubility, and physical interaction between the two components. Sodium hydroxide is the preferred base; however, a wide variety of water-soluble bases may be utilized to achieve comparable results.

Quite unexpectantly, it was found that the use of several additives, unanticipated by the prior art, results in increased rates and extent of biodegradability, when used in conjunction with the method of this invention. A salt of stearic acid has been found to favorably impact the physical characteristics of the starch-polymer composite such that lower starch levels may be utilized without compromising biodegradability. In addition, when used in the quantities described herein, the method is enhanced and auxiliary processes, such as blown-film extrusion, are improved. The stearate employed may be one of a number of commercially-available stearic acid salts, such that the physical characteristics meet the requirements of a continuous method of preparation. Calcium stearate is preferred. It may be pre-mixed with the starch and the copolymer components. Alternatively, and in preferred embodiments of this invention, a separate feeder may be used to control more precisely the amount utilized, and the rate of introduction into the dry mixture.

Likewise, it has been found that when used in conjunction with the continuous process of this invention, the inclusion of a water-soluble lubricant in the aqueous component provides process and composition benefits not otherwise realized. Depending upon the formulation utilized, the amount of lubricant varies considerably. However, when used as described herein, the presence of a lubricant in the aqueous phase provides greater film flexibility and permits the use of higher starch levels. Suitable lubricants include glycerol, sorbitol, ethylene glycol, and low molecular weight polypropylene glycol. These and other suitable materials are well-known to those skilled in the art and available through a variety of commercial sources.

An important aspect of this invention is the use of an ethylene acrylic acid copolymer having an acrylic acid component comprising less than 20% by weight of the copolymer. Most commercially-available EAA copolymers are 20% acrylic acid, and conventional wisdom is that greater performance and physical properties are derived through maximizing the acrylic acid content of the copolymer. As such, preparation of composite materials having acrylic acid levels of 8-12% would not seem appropriate for use. However, under the test conditions utilized, those compositions with the lower acrylic acid content provided enhanced tensile strengths as compared to those compositions incorporating the 20% acrylic acid copolymer (Refer to example X, below).

Ethylene acrylic acid copolymers useful with the prepatory method described herein and as part of the compositions derived therefrom may be obtained from a variety of sources, including, without limitation, the DuPont, Chevron and Exxon Chemical Companies. A preferred copolymer is one having 9.5% acrylic acid content and is available under the Primacol trademark, as manufactured by the Dow Chemical Company. For the purpose of this discussion, the term "ethylene acrylic acid copolymer" includes, without limitation, those copolymers having a wide variety of possible ethylene and acrylic acid levels. Furthermore, the acrylic acid component may include any one of a number of methylated/alkylated acrylic acids, methyl/alkyl esters of acrylic acids and combinations thereof.

The following nonlimiting examples illustrate starch-polymer composites prepared through use of the method of this invention.

EXAMPLE I

| Material | Amount (lbs) | Used % |
|---|---|---|
| Starch, unmodified pearl | 0.450 | 39.6% |
| Calcium Stearate | 0.009 | 0.9% |
| EAA[1] | 0.300 | 29.9% |
| Polyethylene[2] | 0.200 | 19.9% |
| Liquids = 0.18 Water,[4] pH = 11.0 | 0.120 | 4.3% |
| Glycerin, 33% in $H_2O$ | 0.060 | 5.4% |
| TOTAL | 1.139 | 100.0% |

[1]Primacor ® 5981, melt index (MI) = 300, acrylic acid = 20%, Dow Chemical Company
[2]LLDPE (Liner Low Density Polyethylene) Dowlex 2101, MI = 1.6, density = 0.924 g/cc, Dow Chemical Company.
[3]Calculations assume an estimated 25% of total water 90% of lubricant remains. Analytical tests for moisture content support these estimates.
[4]pH adjusted through additional NaOH The composite of this example is prepared as follows: the starch and calcium stearate are pre-mixed in the desired ratios and loaded into an accurate screw-type feeding device. The EAA and polyethylene are loaded into separate screw-type feeding devices. The liquid components, water and glycerin, are premixed in the desired ratios. The liquid mix is adjusted to a pH of 11.0 to 11.5 using anhydrous sodium hydroxide powder. The liquid is then heated, optionally and preferably, to approximately 95° C.

After observing starting procedures required by the equipment and sensitivity of the materials, the extruder is set at 250 RPM (150 to 350 RPM, preferable). Vacuum pressure is applied to Barrel #10, at 20 to 25 psi. After process stability and an acceptable extruded strand product is achieved, the material may be cooled and pelletized.

EXAMPLE II

The composite of this Example is prepared as described in Example I, except that the EAA is Primacor ® 3460 with a Melt Index=20 g/10 minutes and 9.5% acrylic acid content substituted in its entirety for EAA Primacor 5981. Primacor 3560 is manufactured by the Dow Chemical Company. This example demonstrates the use of an EAA copolymer with an acrylic acid content about 50% lower than that typically used.

EXAMPLE III

The composite of this example is as described in Example I, except that Exxon Exact ® LLDPE SLP-0242, MI=1.3 g/10 minutes, density=0.900 g/cc, is used.

EXAMPLE IV

This composite (prepared as Example I) shows the use of Nucrel ® 925 (DuPont Chemical Company) ethylene/methyl acrylic acid copolymer (EMAA) (MI=25 g/10 minutes; acid number=90) substituted for 15 parts of the ethylene acrylic acid (EAA) such that there is substantially a 50:50 wt/wt ratio of EAA:EMAA. This example shows use of a methylated copolymer, en route to a formulation which provides excellent results, consistent with the inventions described herein.

EXAMPLE V

Prepared as in Examples I and IV, this composite uses Nucrel ® 699 (DuPont Chemical Company) ethylene/methyl acrylic acid copolymer (EMAA) (MI=100 g/10 minutes; acid number=66) substituted for 15 parts of the ethylene acrylic acid (EAA) such that there is substantially a 50:50 wt/wt ratio of EAA:EMAA.

EXAMPLE VI

Extending Examples I, IV and V, the composite of this example is prepared using Chevron EMAC ® DS-1177 ethylene/methyl acrylate copolymer (EMA) (MI=20 g/10 minutes and a 20% methyl acrylate copolymer content) substituted for 15 parts of the ethylene acrylic acid (EAA) such that there is substantially a 50:50 wt/wt ratio of EAA:EMA. The use of a methyl acrylate copolymer is contrary to accepted formulations.

EXAMPLE VII

Prepared as shown in Example I, this formulation uses commercially available Sorbitol (hexahydric alcohol $C_6H_8(OH)_6$) substituted in its entirety for glycerin.

EXAMPLE VIII

| Material | Amount (lbs) | Used % |
|---|---|---|
| Starch, unmodified pearl | 0.444 | 46.5% |
| EAA[1] | 0.380 | 44.2% |
| Liquid[2] = 0.22 Water, pH = 7.0 | 0.198 | 7.0% |
| PPG[3], 10% in $H_2O$ | 0.022 | 2.3% |

-continued

| Material | (lbs) | Amount Used % |
| --- | --- | --- |
| TOTAL | 1.044 | 100.0% |

[1]Primacor ® 5981, (MI) = 300, acrylic acid = 20%, Dow Chemical Company
[2]Calculations assume an estimated 25% of total water and 90% of lubricant remains. Analytical tests for moisture content support these estimates.
[3]Polyproylene glycol.

EXAMPLE IX

Films formulated according to Examples I and VIII were compared under biodegradation test conditions, using the method of ASTM D-5209-92 "Aerobic Biodegradation of Polymers Exposed to a Sewage Sludge Environment," incorporated herein by reference. This test provides the percent carbon converted to $CO_2$; microbial mass, and metabolic products. Approximate Percent Mass Degraded is the ratio of degraded carbon over theoretical carbon content.

Using standard reference degradation curves (positive control-corn starch film; negative control-conventional polyethylene film), the film of Example I was highly degradable, as compared to that of Example XIII, even though the starch content is significantly lower. Not coincidentally, the formulation of Example I includes calcium stearate and glycerin, and was prepared according to the method of this invention.

EXAMPLE X

Strength Properties of Starch-Polymer Composite Formulations, Comparing various EAA Acrylic Acid Contents.

| Acrylic Acid Content* | Melt Index (g/min) | Tensile Strength (psi) | Elongation (%) |
| --- | --- | --- | --- |
| 20% | 300 | 436 | 21 |
| 20% | 1400 | 600 | 22 |
| 12% | 38 | 915 | 10 |
| 9.5% | 20 | 790 | 16 |
| 7% | 300 | 300 | 17 |
| 5% | — | — | — |

*percent of acrylic acid (by weight) in EAA copolymer.

The data of this example was generated by comparing films having identical formulations, except for the EAA component. Each resulting film was tested in an identical manner. At 5% acrylic acid, the resulting films were physically unable to provide reliable melt, strength, or elongation data. (The formulation of tensile strengths and elongation were determined using standard, accepted test procedures.) The data presented above shows, unexpectedly, that reducing the EAA acrylic acid content to a range of about 8-12% improves the physical properties over comparable compositions having higher acid levels. (Example 1, presented above, was the base, non-changing formulation for this comparison.)

While the principles of this invention have been described in connection with specific embodiments, it should be understood clearly that these descriptions are made only by way of example and are not intended to limit the scope of the invention, in any manner. For example, separate feeding mechanisms may be used in conjunction with each dry raw material to facilitate pre-mixing before introduction of the aqueous lubricant component. This approach provides manufacturing flexibility to use raw materials of various forms (pellet, powder, granules and regrind, etc.), as well as providing enhanced control over product quality. Likewise, the temperature and pressure parameters described herein may, and invariably will be, dependent upon the starch, copolymer/polymer, and lubricant components utilized, in addition to the end products and characteristics thereof ultimately desired. Furthermore, preparation of the novel composites disclosed herein is not restricted to continuous processes. Alternatively, batch or semi-continuous methods may be used. Other advantages and features of the invention will become apparent from the claims hereinafter, with the scope of the claims determined by the reasonable equivalents as understood by those skilled in the art.

What is claimed is:

1. A method for the continuous preparation of a starch-based biodegradable/compostable polymer material, comprising:
    providing a substantially homogenous mixture of starch, an ethylene acrylic acid copolymer, and a salt of stearic acid, each of the group of said starch, said ethylene acrylic acid copolymer, and said stearic acid salt being premixed separately before addition of an aqueous lubricant solution;
    adding to said mixture said aqueous lubricant solution, said solution having a pH between 10.0-12.0 and a temperature of less than or equal to about 95° C.;
    raising the temperature of the mixture to about 135° C., such that said starch is gelatinized before and during its mixture with said ethylene acrylic acid polymers and said copolymer is melted and mixed with said starch;
    lowering the mixture temperature to about 110° C.;
    reducing the atmospheric pressure to about 5-28 pounds per square inch to remove excess moisture from the mixture; and
    extruding said plastic material.

2. The method as defined in claim 1 wherein polyethylene is further provided as an additional polymer.

3. The method as defined in claim 1 wherein said lubricant is selected from the group of water-soluble compounds consisting of glycerol, sorbitol, ethylene glycol, and a low molecular weight polypropylene glycol.

4. The method as defined in claim 1 wherein the pH is between 11.0-11.5, said pH obtained by adding a water-soluble alkaline material selected from the group consisting of sodium hydroxide, ammonium hydroxide, and triethanolamine.

5. The method as defined in claim 4 wherein said alkaline material is sodium hydroxide.

6. A method for the continuous preparation of a starch-based biodegradable/compostable polymer material, comprising:
    providing a substantially homogenous mixture of starch, an ethylene acrylic acid copolymer, and a salt of stearic acid, each of the group of said starch, said ethylene acrylic acid copolymer, and said stearic acid salt being premixed separately before addition of an aqueous lubricant solution;
    adding to said mixture said aqueous lubricant solution, said solution having a pH between 10.0-12.0 and a temperature of less than or equal to about 95° C.;
    raising the temperature of the mixture to about 135° C., such that said starch is gelatinized and said copolymer is melted and mixed with said starch;

lowering the-mixture temperature to about 110° C.;
reducing the atmospheric pressure to about 15-25 pounds per square inch to remove excess moisture from the mixture and reduce the mixture to about 5-10% by weight of the mixture; and
extruding said plastic material.

7. The method as defined in claim 6 wherein said moisture is reduced to about 6-8% by weight of the mixture.

8. The method as defined in claim 1 wherein said plastic material is extruded at a temperature of about 135° C.

9. The method as defined in claim 1 further including the step of cooling said extruded plastic material.

10. The method as defined in claim 9 wherein said material is cooled by air.

11. A method for the continuous preparation of a starch-based biodegradable/compostable polymer material, comprising
providing a substantially homogenous mixture of starch, an ethylene acrylic acid copolymer, and a salt of stearic acid, wherein said starch is about 30-50% by weight, said copolymer is about 10-40% by weight, and said stearic acid salt is about 0.5-1.5% by weight of the total material composition, each of the group of said starch, said ethylene acrylic acid copolymer, and said stearic acid salt being premixed separately before addition of an aqueous lubricant solution;
adding to said mixture said aqueous lubricant solution, said solution having a pH between 10.0-12.0 and a temperature of less than or equal to about 95° C.;
raising the temperature of the mixture to about 135° C., such that said starch is gelatinized and said copolymer is melted and mixed with said starch;
lowering the mixture temperature to about 110° C.;
reducing the atmospheric pressure to about 5-28 pounds per square inch to remove excess moisture from the mixture; and
extruding said plastic material.

12. The method as defined in claim 1 wherein polyethylene is further provided as an additional polymer in an amount about 1-40% by weight of the material composition.

13. The method as defined in claim 11 wherein the acrylic acid component of said copolymer is about 8-12% by weight.

14. The method as defined in claim 11 wherein said lubricant is selected from the group of water-soluble compounds consisting of glycerol, sorbitol, ethylene glycol, and a low molecular weight polypropylene glycol.

15. The method as defined in claim 14 wherein the lubricant is glycerol, in an amount about 1-20% by weight of the material composition.

16. The method as defined in claim 15 wherein glycerol is about 2-15% by weight of the material composition.

17. The method of claim 11 wherein the pH is between 11.0-11.5, said pH obtained by adding a water-soluble alkaline material selected from the group consisting of sodium hydroxide, ammonium hydroxide, and triethanolamine.

18. The method of claim 17 wherein said alkaline material is sodium hydroxide.

19. The method as defined in claim 11 wherein said starch is gelatinized Before and during mixture with said ethylene acrylic acid copolymer.

20. The method as defined in claim 11 wherein said plastic is extruded at a temperature of about 135° C.

21. The method as defined in claim 11 further including the step of cooling said extruded plastic material.

22. The method as defined in claim 21 wherein said material is cooled by air.

* * * * *